(12) United States Patent
Choi (10) Patent No.: US 12,169,344 B2
(45) Date of Patent: Dec. 17, 2024

(54) PIXEL UNIT AND DRIVING METHOD THEREFOR, ARRAY SUBSTRATE, AND VERTICAL ALIGNMENT LIQUID CRYSTAL DISPLAY DEVICE

(71) Applicant: BOE TECHNOLOGY GROUP CO., LTD., Beijing (CN)

(72) Inventor: Hyunsic Choi, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 138 days.

(21) Appl. No.: 17/798,170

(22) PCT Filed: Sep. 16, 2021

(86) PCT No.: PCT/CN2021/118721
§ 371 (c)(1),
(2) Date: Aug. 8, 2022

(87) PCT Pub. No.: WO2022/089081
PCT Pub. Date: May 5, 2022

(65) Prior Publication Data
US 2023/0099046 A1 Mar. 30, 2023

(30) Foreign Application Priority Data

Oct. 29, 2020 (CN) .......................... 202011181732.7

(51) Int. Cl.
*G02F 1/1368* (2006.01)
*G02F 1/1343* (2006.01)
*G02F 1/1362* (2006.01)

(52) U.S. Cl.
CPC ...... *G02F 1/1368* (2013.01); *G02F 1/134363* (2013.01); *G02F 1/136222* (2021.01); *G02F 1/13624* (2013.01); *G02F 1/136286* (2013.01)

(58) Field of Classification Search
CPC .......... G02F 1/134363; G02F 1/13624; G02F 1/1368
See application file for complete search history.

(56) References Cited

U.S. PATENT DOCUMENTS

2001/0001568 A1* 5/2001 Hiroshi ............. G02F 1/134363
349/123
2005/0046763 A1* 3/2005 Ono ................... G02F 1/134363
349/39

(Continued)

FOREIGN PATENT DOCUMENTS

CN 101943829 A 1/2011
CN 202748579 U 2/2013

(Continued)

*Primary Examiner* — Jessica M Merlin
(74) *Attorney, Agent, or Firm* — IP & T GROUP LLP (57) ABSTRACT

A pixel unit includes: a first insulating layer; a first pixel electrode located on a first side of the first insulating layer and including a plurality of first electrode strips; a common electrode located on the first side of the first insulating layer and including a plurality of second electrode strips, the second electrode strips and the first electrode strips being sequentially and alternately arranged in a first direction, and slits each being disposed between a second electrode strip in the second electrode strips and a first electrode strip in the first electrode strips that are adjacent to each other; and a second pixel electrode located on a second side of the first insulating layer. The second side of the first insulating to layer is opposite to the first side of the first insulating layer. The second pixel electrode is overlapped with at least a region where the slits are located.

9 Claims, 10 Drawing Sheets

(56) References Cited

U.S. PATENT DOCUMENTS

| | | | |
|---|---|---|---|
| 2008/0218645 A1 | 9/2008 | Zhu et al. | |
| 2011/0299024 A1* | 12/2011 | Lee | G02F 1/1368 29/829 |
| 2015/0153619 A1 | 6/2015 | Murata et al. | |
| 2015/0212372 A1 | 7/2015 | Moon et al. | |
| 2016/0004127 A1 | 1/2016 | Qu et al. | |
| 2017/0153518 A1 | 6/2017 | Tang | |
| 2017/0192282 A1* | 7/2017 | Tang | G02F 1/1368 |
| 2020/0326599 A1* | 10/2020 | Fan | G02F 1/133345 |

FOREIGN PATENT DOCUMENTS

| | | | | |
|---|---|---|---|---|
| CN | 103176317 A | | 6/2013 | |
| CN | 103488008 A | | 1/2014 | |
| CN | 104793422 A | | 7/2015 | |
| CN | 109239989 A | * | 1/2019 | ....... G02F 1/133345 |
| CN | 109324449 A | | 2/2019 | |
| CN | 112162425 A | | 1/2021 | |
| WO | 2016197419 A1 | | 12/2016 | |

* cited by examiner

Apply a common voltage to the common electrode, and apply pixel voltages having a same magnitude and opposite polarities to the first pixel electrode and the second pixel electrode, respectively, so as to drive the pixel unit. — S1

FIG. 7A

Apply a common voltage to the common electrode, and apply pixel voltages having a same magnitude and opposite polarities to the first pixel electrode and the second pixel electrode, respectively, so as to drive the pixel unit. — S1

Switch the pixel voltages respectively applied to the first pixel electrode and the second pixel electrode to each other, and repeat this step — S2

FIG. 10

PIXEL UNIT AND DRIVING METHOD THEREFOR, ARRAY SUBSTRATE, AND VERTICAL ALIGNMENT LIQUID CRYSTAL DISPLAY DEVICE

CROSS-REFERENCE TO RELATED APPLICATIONS

This application is a national phase entry under 35 USC 371 of International Patent Application No. PCT/CN 2021/118721 filed on Sep. 16, 2021, which claims priority to Chinese Patent Application No. 202011181732.7, filed on Oct. 29, 2020, which are incorporated herein by reference in their entirety.

TECHNICAL FIELD

The present disclosure relates to the field of display technologies, and in to particular, to a pixel unit and a driving method therefor, an array substrate, and a vertical alignment liquid crystal display device.

BACKGROUND

Liquid crystal display technologies are widely used in electronic products such as televisions and mobile phones due to their advantages of stable display and low power consumption.

At present, display modes of a liquid crystal display device may be mainly divided into a twisted nematic (TN) mode, an in-plane switching (IPS) mode and an advanced super dimension switching (ADS) mode. In the ADS mode, a multidimensional electric field is formed by electric fields generated between edges of electrodes in the same plane and an electric field generated between an electrode layer and a plate-like electrode layer, so that liquid crystal molecules between the electrodes and directly above the electrodes are rotated.

SUMMARY

In an aspect, a pixel unit is provided. The pixel unit includes: a first insulating layer; a first pixel electrode located on a first side of the first insulating layer and including a plurality of first electrode strips; a common electrode located on the first side of the first insulating layer and including a plurality of second electrode strips, the second electrode strips and the first electrode strips being sequentially and alternately arranged in a first direction, and slits each being disposed between a second electrode strip in the second electrode strips and a first electrode strip in the first electrode strips that are adjacent to each other; and a second pixel electrode located on a second side of the first insulating to layer. The second side of the first insulating layer is opposite to the first side of the first insulating layer. The second pixel electrode is overlapped with at least a region where the slits are located.

In some embodiments, the pixel unit further includes: a first thin film transistor located on the second side of the first insulating layer, a control electrode of the first thin film transistor being configured to be coupled to a scan signal line, a first electrode of the first thin film transistor being configured to be coupled to a first data voltage line, and a second electrode of the first thin film transistor being coupled to the plurality of first electrode strips of the first pixel electrode; and a second thin film transistor located on the second side of the first insulating layer, a control electrode of the second thin film transistor being configured to be coupled to the scan signal line, a first electrode of the second thin film transistor being configured to be coupled to a second data voltage line, and a second electrode of the second thin film transistor being coupled to the second pixel electrode. The common electrode is configured to be coupled to a common voltage line.

In some embodiments, the first insulating layer includes a first via. The first pixel electrode further includes a first conductive connection portion. The first conductive connection portion is connected to the plurality of first electrode strips, and is connected to the second electrode of the first thin film transistor through the first via.

In some embodiments, a gate insulating layer of the second thin film transistor includes a second via. The first insulating layer includes a third via exposing the second via. The common electrode further includes a second conductive connection portion. The second conductive connection portion is connected to the plurality of second electrode strips, and is connected to the common voltage line through the second via and the third via.

In some embodiments, the second pixel electrode is a planar electrode located between the first insulating layer and a gate insulating layer of the second thin film transistor. The planar electrode is directly connected to the second electrode of the second thin film transistor.

In some embodiments, the second pixel electrode includes a planar electrode and a third conductive connection portion, and the planar electrode is located on a side of a gate insulating layer of the second thin film transistor away from the first insulating layer. The gate insulating layer includes a fourth via. The third conductive connection portion is connected to the second electrode of the second thin film transistor, and is connected to the planar electrode through the fourth via. Alternatively, the second pixel electrode includes the planar electrode and the third conductive connection portion, and the planar electrode is located on the side of the gate insulating layer of the second thin film transistor away from the first insulating layer. The gate insulating layer includes the fourth via. The first insulating layer includes a fifth via exposing the fourth via and a sixth via exposing the second electrode of the second thin film transistor. The third conductive connection portion is connected to the second electrode of the second thin film transistor through the sixth via, and is connected to the planar electrode through the fourth via and the fifth via.

In some embodiments, the plurality of first electrode strips and the plurality of second electrode strips are straight strips.

In some embodiments, each of the plurality of first electrode strips includes at least two first electrode segments connected in sequence. Two adjacent first electrode segments have a first included angle therebetween, and the first included angle is greater than 0 degree and less than 180 degrees. Each of the plurality of second electrode strips includes at least two second electrode segments connected in sequence. Two adjacent second electrode segments have a second included angle therebetween, and the second included angle is greater than 0 degree and less than 180 degrees.

In some embodiments, a plane perpendicular to the first insulating layer and perpendicular to the first direction is a reference plane. An included angle between each of at least one first electrode segment and the reference plane is 45±7 degrees; or an included angle between each of at least one second electrode segment and the reference plane is 45±7 degrees; or the included angle between each of the at least one first electrode segment and the reference plane is 45±7 degrees, and the included angle between each of the at least one second electrode segment and the reference plane is 45±7 degrees.

In some embodiments, a width of a slit in the slits in the first direction is greater than or equal to 6.6 µm, and is less than or equal to 7.3 µm.

In another aspect, a driving method of the pixel unit in any one of the above embodiments is provided. The driving method includes: applying a common voltage to the common electrode, and applying pixel voltages having a same magnitude and opposite polarities to the first pixel electrode and the second pixel electrode, respectively, so as to drive the pixel unit.

In some embodiments, the driving method further includes: switching the pixel voltages respectively applied to the first pixel electrode and the second pixel electrode to each other, and repeating this step.

In yet another aspect, an array substrate is provided. The array substrate has a plurality of pixel regions. The array substrate includes: a plurality of pixel units in any one of the above embodiments; a plurality of scan signal lines extending in the first direction; a plurality of common voltage lines extending in the first direction; a plurality of first data voltage lines extending in a second direction intersecting the first direction; and a plurality of second data voltage lines extending in the second direction. Each pixel region is defined by a second data voltage line, a scan signal line, a common voltage line, and a first data voltage line. The pixel region is provided with a pixel unit in the plurality of pixel units therein.

In yet another aspect, a vertical alignment liquid crystal display device is provided. The vertical alignment liquid crystal display device includes: the array substrate in any one of the above embodiments; a color filter substrate arranged opposite to the array substrate; and a liquid crystal layer disposed between the array substrate and the color filter substrate.

In some embodiments, the vertical alignment liquid crystal display device further includes: a first polarizer located on a side of the color filter substrate away from the liquid crystal layer; and a second polarizer located on a side of the array substrate away from the liquid crystal layer. One of a polarization direction of the first polarizer and a polarization direction of the second polarizer is parallel to the first direction, and another one of the polarization direction of the first polarizer and the polarization direction of the second polarizer is perpendicular to the first direction.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, and are not limitations on an actual size of a product, an actual process of a method, and an actual timing of a signal involved in the embodiments of the present disclosure.

DETAILED DESCRIPTION

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to." In the description of the specification, to the terms such as "one embodiment," "some embodiments," "exemplary embodiments," "an example," "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms such as "first" and "second" are only used for descriptive purposes, and are not to be construed as indicating or implying relative importance or implicitly indicating the number of indicated technical features. Thus, a feature defined with "first" or "second" may explicitly or implicitly include one or more of the features. In the description of the embodiments of the present disclosure, the term "a plurality of/the plurality of" means two or more unless otherwise specified.

In the description of some embodiments, the terms such as "coupled" and "connected" and extensions thereof may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the contents herein.

The use of the phase "applicable to" or "configured to" herein means an open and inclusive expression, which does not exclude devices that are applicable to or configured to perform additional tasks or steps.

In addition, the use of the phase "based on" means openness and inclusiveness, since a process, step, calculation or other action that is "based on" one or more stated conditions or values may, in practice, be based on additional conditions or values exceeding those stated.

Exemplary embodiments are described herein with reference to sectional views and/or plan views as idealized exemplary drawings. In the accompanying drawings, thicknesses of layers and sizes of regions are enlarged for clarity. Thus, variations in shape relative to the accompanying drawings due to, for example, manufacturing techniques and/or tolerances may be envisaged. Therefore, the exemplary embodiments should not be construed to be limited to the shapes of regions shown herein, but to include deviations in shape due to, for example, manufacturing. For example, an etched region shown in a rectangular shape generally has a curved feature. Therefore, the regions shown in the accompanying drawings are schematic in nature, and their shapes are not intended to show actual shapes of the regions in a device, and are not intended to limit the scope of the exemplary embodiments.

Figure 1:
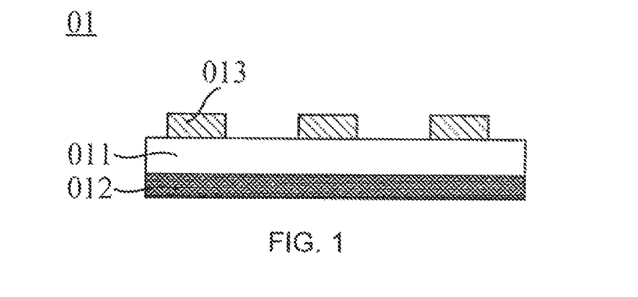
FIG. 1 is a structural diagram of a pixel unit, in accordance with the related art.

In the ADS mode, electrodes are only provided on an array substrate of a liquid crystal display device. In the related art, as shown in FIG. 1, a pixel unit 01 of the array substrate includes a common electrode 012 and a pixel electrode 013 respectively located on two opposite sides of an insulating layer 011. In this case, electric fields formed by respectively applying voltages to the common electrode 012 and the pixel electrode 013 include a vertical electric field and horizontal electric fields. In a case where liquid crystals are initially aligned in a vertical state (i.e., the liquid crystal display device is a vertical alignment display device), the vertical electric field required for driving the liquid crystals to deflect in the above electric fields is weak, which results in an increased driving voltage.

Based on this, some embodiments of the present disclosure provide a pixel unit 10. Referring to FIGS. 2A, 2B, 2C, 3A and 3B, the pixel unit 10 includes a first insulating layer 1, a first pixel electrode 2, a common electrode 3 and a second pixel electrode 4.

The first pixel electrode 2 is located on a first side E1 of the first insulating layer 1, and includes a plurality of first electrode strips 21.

The common electrode 3 is located on the first side E1 of the first insulating layer 1, and includes a plurality of second electrode strips 31. The second electrode strips 31 and the first electrode strips 21 are sequentially and alternately arranged in a first direction X. Slits D each are provided between a second electrode strip 31 and a first electrode strip 21 that are adjacent to each other. For example, a width of the slit D in the first direction X is greater than or equal to 6.6 μm, and is less than or equal to 7.3 μm. This arrangement is conducive to improving a transmittance of the pixel unit 10.

The second pixel electrode 4 is located on a second side E2 of the first insulating layer 1 that is opposite to the first side E1 of the first insulating layer 1. The second pixel electrode 4 is overlapped with at least a region where the slits D are located.

Figure 4A:
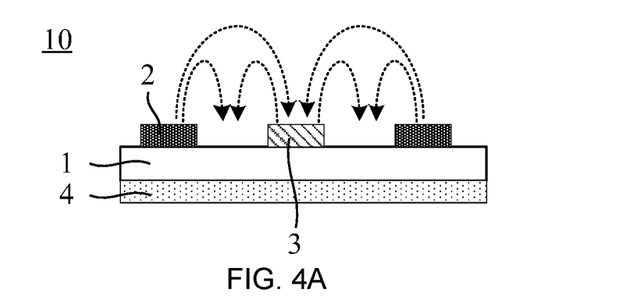
FIG. 4A is a distribution diagram of electric fields in a pixel unit, in accordance with some embodiments of the present disclosure.
Figure 4B:
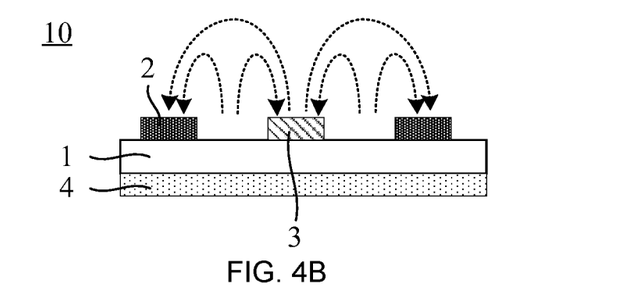
FIG. 4B is another distribution diagram of electric fields in a pixel unit, in accordance with some embodiments of the present disclosure.

In a case where the pixel unit 10 is driven, a common voltage may be applied to the common electrode 3, and pixel voltages having the same magnitude and opposite polarities may be respectively applied to the first pixel electrode 2 and the second pixel electrode 4. In a case where the pixel voltage applied to the first pixel electrode 2 is a positive voltage, and the pixel voltage applied to the second pixel electrode 4 is a negative voltage, directions of electric fields in the pixel unit 10 are directions indicated by the dotted arrows in FIG. 4A. In a case where the pixel voltage applied to the first pixel electrode 2 is a negative voltage, and the pixel voltage applied to the second pixel electrode 4 is a positive voltage, the directions of the electric fields in the pixel unit 10 are directions indicated by the dotted arrows in FIG. 4B. When different frame images are displayed, the pixel voltages respectively applied to the first pixel electrode 2 and the second pixel electrode 4 may be switched to each other, which is conducive to preventing liquid crystals from being deteriorated.

It will be noted that in the pixel unit 10, a region where a voltage difference is largest is a region between the first pixel electrode 2 and the second pixel electrode 4. Since the first pixel electrode 2 and the second pixel electrode 4 are respectively located on two opposite sides of the first insulating layer 1, a vertical electric field is enhanced, so that a driving voltage of the liquid crystals may be reduced (i.e., the pixel voltage may be reduced).

It is worth pointing out that through experiments, in the pixel unit 01 shown in FIG. 1, the vertical electric field is approximately 60% to 65% of the electric fields as a whole. However, in the pixel unit 10, the vertical electric field is approximately 80% or more of the electric fields as a whole, and the vertical electric field is strengthened.

Figure 5:
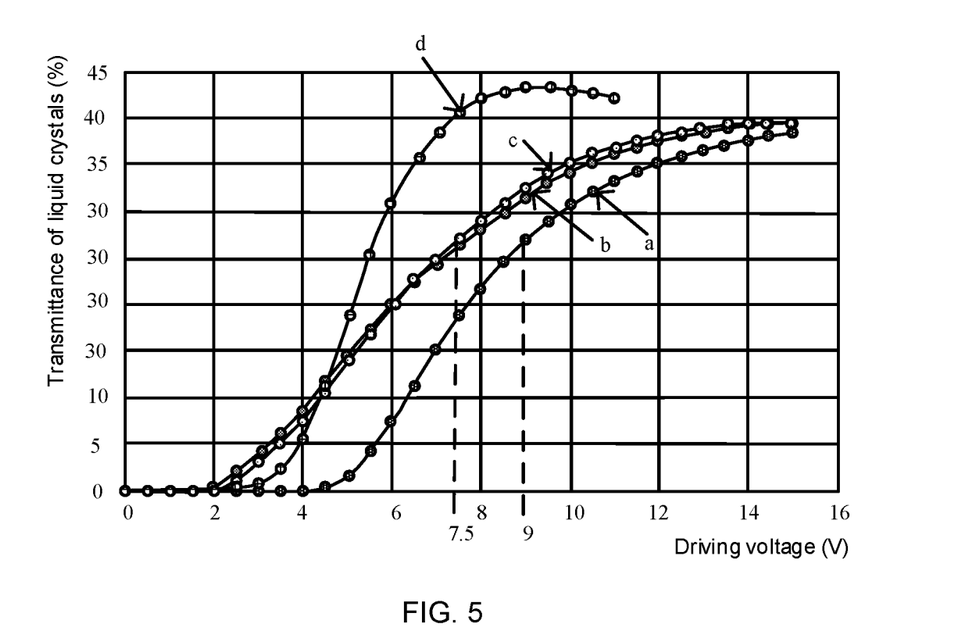
FIG. 5 is a graph showing a relative relationship between a driving voltage and a transmittance of liquid crystals, in accordance with some embodiments of the present disclosure.

FIG. 5 is a graph showing a relative relationship between a driving voltage and a transmittance of liquid crystals in a pixel unit. As shown in FIG. 5, Curve a shows a relative relationship between a driving voltage and a transmittance in the pixel unit 01 in FIG. 1 in a case where the thickness of the insulating layer 011 is 6000 Å, and the liquid crystals with a dielectric constant of −5.9 and an initial vertical alignment are driven. Curve b shows a relative relationship between the driving voltage and a transmittance in the pixel unit 10 in FIG. 4A or 4B in a case where the thickness of the first insulating layer 1 is 6000 Å, and the liquid crystals with a dielectric constant of −5.9 and an initial vertical alignment are driven. Curve c shows a relative relationship between the driving voltage and the transmittance in the pixel unit 10 in FIG. 4A or 4B in a case where the thickness of the first insulating layer 1 is 4000 Å, and the liquid crystals with a dielectric constant of −3.9 and an initial vertical alignment are driven. Curve d shows a relative relationship between the driving voltage and the transmittance in the pixel unit 01 in FIG. 1 in a case where the liquid crystals with an initial horizontal alignment are driven.

It can be seen from Curve a and Curve d in FIG. 5 that an efficiency of driving the liquid crystals with the initial horizontal alignment in the pixel unit 01 is higher than an efficiency of driving the liquid crystals with the initial vertical alignment in the pixel unit 01. Therefore, for the liquid crystals with the initial vertical alignment, the use of the pixel unit 01 results in an increase in the required driving voltage.

A transmittance corresponding to a driving voltage of 9 V for Curve a is approximately the same as a transmittance corresponding to a driving voltage of 7 V to 7.5 V for Curve b or Curve c. It can be seen that when the liquid crystals with the initial vertical alignment are driven, the driving voltage of the pixel unit 10 may be reduced by about 1.5 V compared to the pixel unit 01.

Moreover, it can be seen from FIG. 5 that in a case where the liquid crystals are driven by using the pixel unit 10, even if the dielectric constant of the liquid crystals is changed from −5.9 to −3.9, the curve of the driving voltage and the transmittance do not have a large difference (i.e., Curve b and Curve c in FIG. 5 have a small difference). In this case, the liquid crystals with a lower viscosity (e.g., the liquid crystals with a dielectric constant of −3.9) may be selected, which is conducive to improving a response speed of the liquid crystals.

In some embodiments of the present disclosure, referring to FIGS. 2A, 2B, 2C, 3A and 3B, the pixel unit 10 further includes a first thin film transistor 5 and a second thin film transistor 6.

The first thin film transistor 5 is located on the second side E2 of the first insulating layer 1. A control electrode 50 of the first thin film transistor 5 is configured to be coupled to a scan signal line 101, a first electrode 51 of the first thin film transistor 5 is configured to be coupled to a first data voltage line 102, and a second electrode 52 of the first thin film transistor 5 is configured to be coupled to the plurality of first electrode strips 21 of the first pixel electrode 2.

Figure 2A:
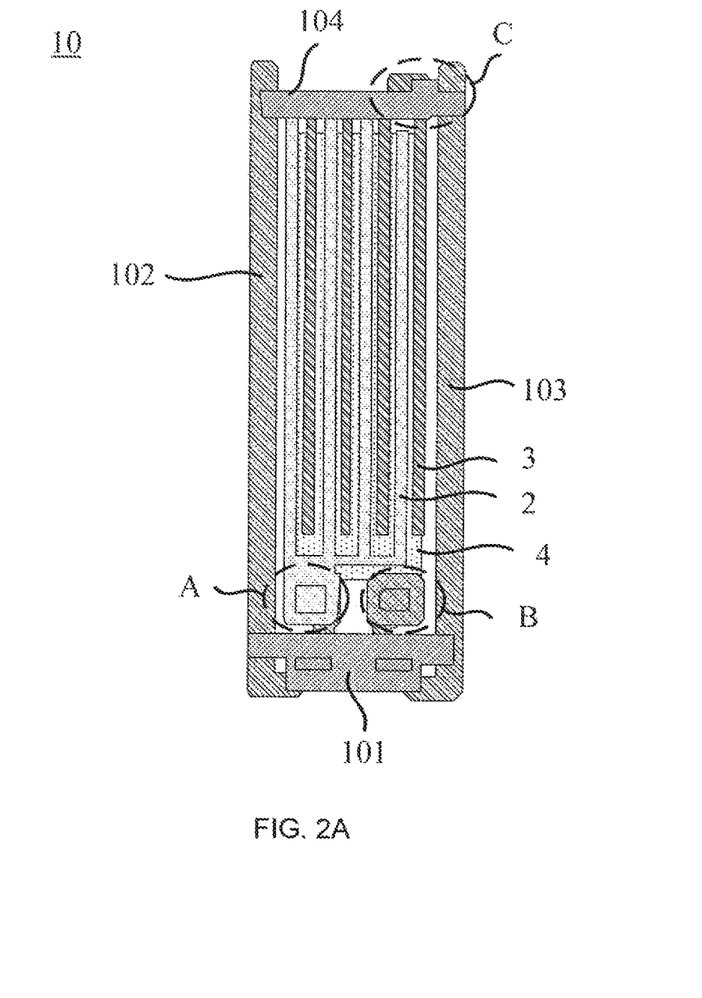
FIG. 2A is a structural diagram of a pixel unit, in accordance with some embodiments of the present disclosure.
Figure 2B:
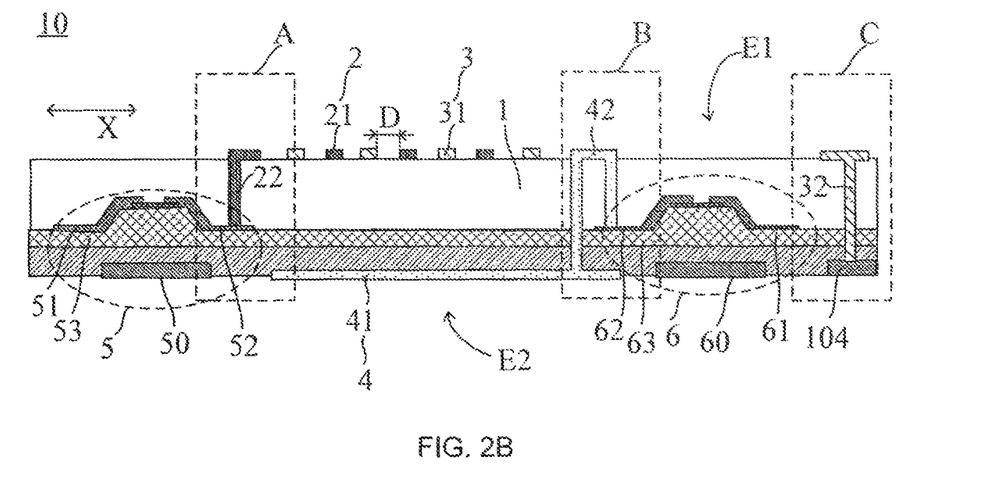
FIG. 2B is a sectional view of the pixel unit in FIG. 2A.
Figure 2C:
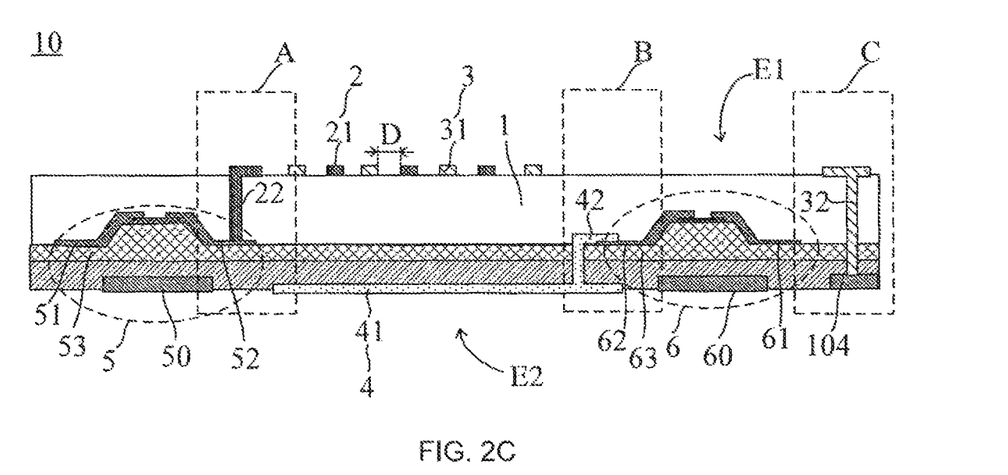
FIG. 2C is a sectional view of another pixel unit, in accordance with some embodiments of the present disclosure.
Figure 3A:
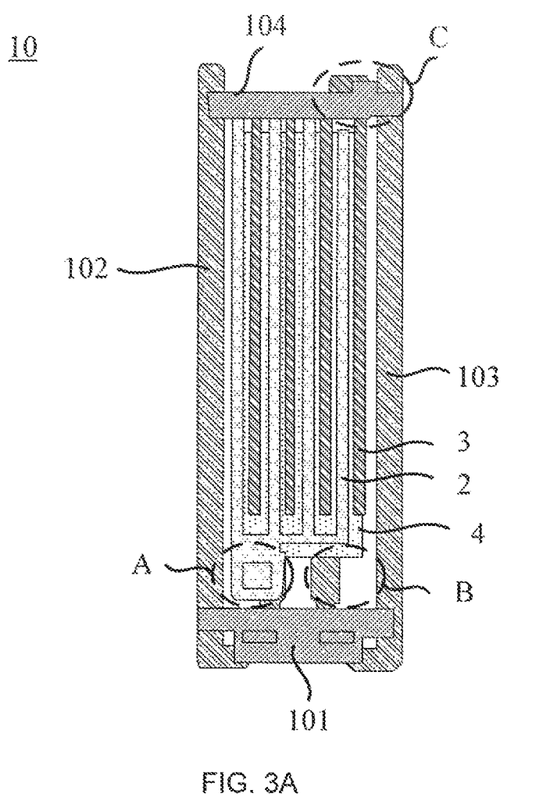
FIG. 3A is a structural diagram of yet another pixel unit, in accordance with some embodiments of the present disclosure.
Figure 3B:
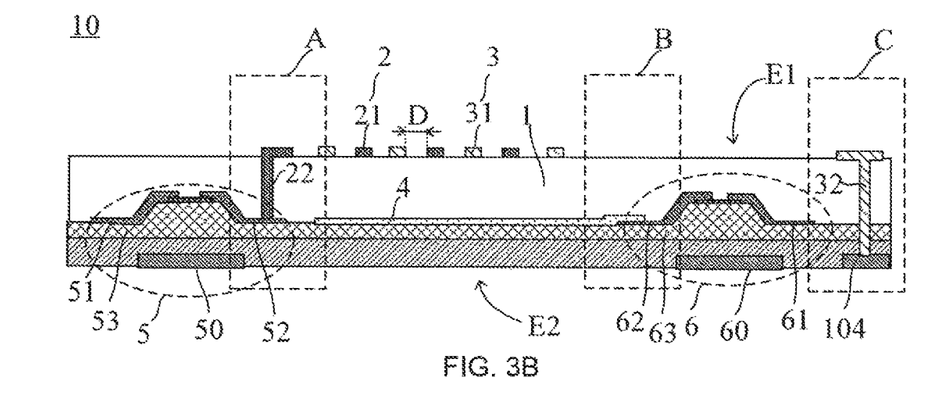
FIG. 3B is a sectional view of the pixel unit in FIG. 3A.

For example, as shown in FIGS. 2B, 2C and 3B, the first insulating layer 1 includes a first via. The first pixel electrode 2 further includes a first conductive connection portion 22. The first conductive connection portion 22 is connected to the plurality of first electrode strips 21, and is connected to the second electrode 52 of the first thin film transistor 5 through the first via.

In this way, the first thin film transistor 5 may be controlled to be turned on or off by a signal transmitted by the scan signal line 101. Moreover, when the first thin film transistor 5 is turned on, a first data voltage transmitted by the first data voltage line 102 may be transmitted to the plurality of first electrode strips 21 of the first pixel electrode 2.

Moreover, the common electrode 3 is configured to be coupled to a common voltage line 104. For example, a gate insulating layer 63 of the second thin film transistor 6 includes a second via. The first insulating layer 1 further includes a third via exposing the second via. The common electrode 3 includes a second conductive connection portion 32. The second conductive connection portion 32 is connected to the plurality of second electrode strips 31, and is connected to the common voltage line 104 through the second via and the third via. In this way, a common voltage transmitted by the common voltage line may be transmitted to the plurality of second electrode strips 31 of the common electrode 3.

The second thin film transistor 6 is located on the second side E2 of the first insulating layer 1. A control electrode 60 of the second thin film transistor 6 is configured to be coupled to the scan signal line 101, a first electrode 61 of the second thin film transistor 6 is configured to be coupled to a second data voltage line 103, and a second electrode 62 of the second thin film transistor 6 is configured to be coupled to the second pixel electrode 4.

In this way, the second thin film transistor 6 may be controlled to be turned on or off by the signal transmitted by the scan signal line 101. Moreover, when the second thin film transistor 6 is turned on, a second data voltage transmitted by the second data voltage line 103 may be transmitted to the second pixel electrode 4. It will be understood that the second data voltage and the first data voltage are pixel voltages. For example, the second data voltage and the first data voltage may be the two pixel voltages having the same magnitude and opposite polarities as described above.

In some examples, as shown in FIGS. 2A and 2B, the second pixel electrode 4 includes a planar electrode 41 and a third conductive connection portion 42. The planar electrode 41 is located on a side of the gate insulating layer 63 of the second thin film transistor 6 away from the first insulating layer 1. The gate insulating layer 63 includes a fourth via. The first insulating layer includes a fifth via exposing the fourth via and a sixth via exposing the second electrode 62 of the second thin film transistor 6. The third conductive connection portion 42 is connected to the second electrode 62 of the second thin film transistor 6 through the sixth via, and is connected to the planar electrode 41 through the fourth via and the fifth via.

Alternatively, as shown in FIG. 2C, the second pixel electrode 4 includes a planar electrode 41 and a third conductive connection portion 42. The planar electrode 41 is located on the side of the gate insulating layer 63 of the second thin film transistor 6 away from the first insulating layer 1. The gate insulating layer 63 includes a fourth via. The third conductive connection portion 42 is connected to the second electrode 62 of the second thin film transistor 6, and is connected to the planar electrode 41 through the fourth via.

In some other examples, as shown in FIGS. 3A and 3B, the second pixel electrode 4 is a planar electrode located between the first insulating layer 1 and the gate insulating layer 63 of the second thin film transistor 6. In this case, the second pixel electrode 4 is directly connected to the second electrode 62 of the second thin film transistor 6. In this way, when the second pixel electrode 4 is connected to the second electrode 62 of the second thin film transistor 6, it is not necessary to drill vias in the first insulating layer 1 and the gate insulating layer 63.

It will be noted that a control electrode of each thin film transistor (e.g., the first thin film transistor 5 or the second thin film transistor 6) is a gate, a first electrode of the thin film transistor is one of a source and a drain, and a second electrode of the thin film transistor is another one of the source and the drain. Since the source and the drain of the thin film transistor may be symmetrical in structure, the source and the drain thereof may be the same in structure. That is, the first electrode and the second electrode of the thin film transistor in the embodiments of the present disclosure may be the same in structure.

For example, the gate insulating layer 63 of the second thin film transistor 6 is the same as a gate insulating layer 53 of the first thin film transistor 5. That is, the gate insulating layer 63 of the second thin film transistor 6 and the gate insulating layer 53 of the first thin film transistor 5 may be connected as a single film layer.

For example, orthographic projections of the plurality of first electrode strips 21 on the first insulating layer 1 and orthographic projections of the plurality of second electrode strips 31 on the first insulating layer 1 are all located within an orthographic projection of the planar electrode on the first insulating layer 1.

In addition, the first electrode strip 21 and the second electrode strip 31 each have various structural forms, including, for example, but not limited to, some examples below.

For example, as shown in FIGS. 2A and 3A, the first electrode strips 21 and the second electrode strips 31 may extend in the same direction. That is, the first electrode strips 21 and the second electrode strips 31 may be straight strips. The first electrode strip 21 and the second electrode strip 31 may be parallel to each other.

Figure 6A:
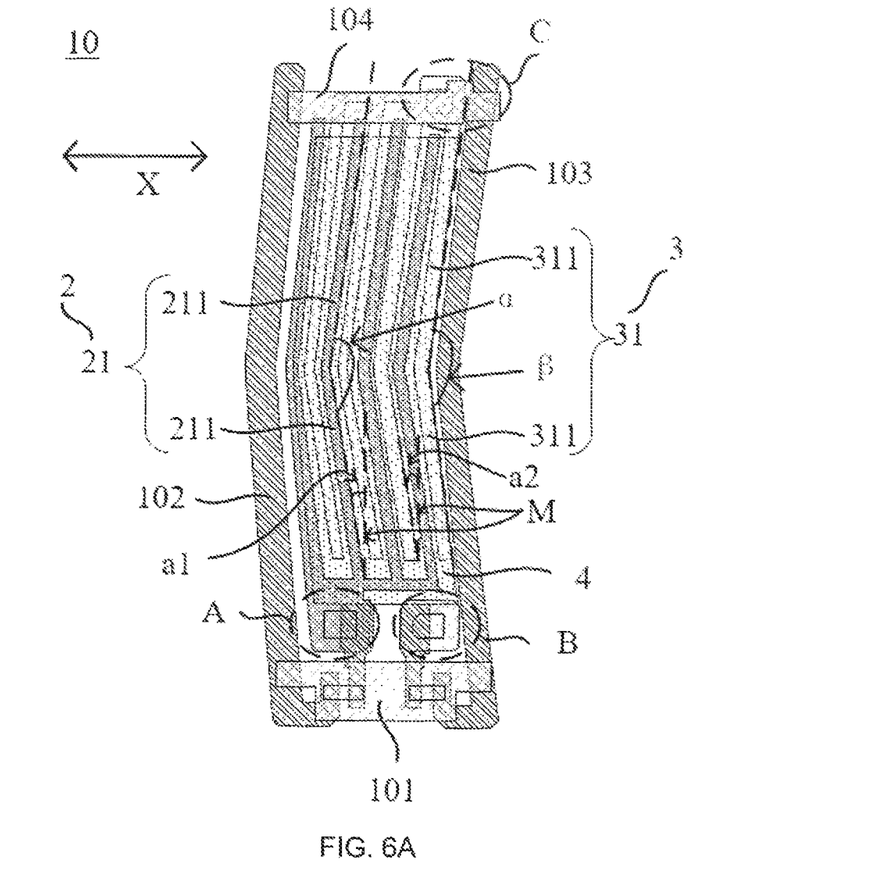
FIG. 6A is a structural diagram of yet another pixel unit, in accordance with some embodiments of the present disclosure.
Figure 6B:
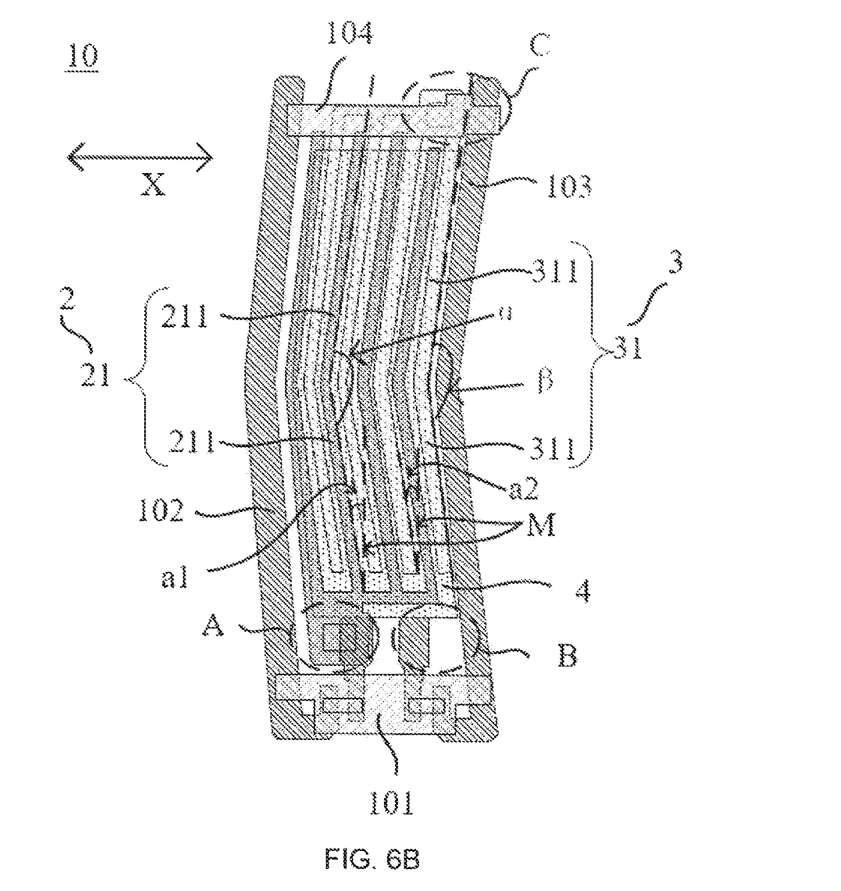
FIG. 6B is a structural diagram of yet another pixel unit, in accordance with some embodiments of the present disclosure.

For another example, FIG. 6A shows a pixel unit 10 requiring drilling at B, and FIG. 6B shows a pixel unit 10 that does not require drilling at B. As shown in FIGS. 6A and 6B, each of the plurality of first electrode strips 21 may include at least two first electrode segments 211 connected in sequence. Two adjacent first electrode segments 211 have a first included angle α therebetween, and the first included angle α is greater than 0 degree and less than 180 degrees.

Moreover, each of the plurality of second electrode strips 31 may include at least two second electrode segments 311 connected in sequence. Two adjacent second electrode segments 311 have a second included angle β, and the second included angle β is greater than 0 degree and less than 180 degrees.

The first electrode strip 21 and the second electrode strip 31 may be parallel to each other.

In some embodiments, referring to FIGS. 6A and 6B again, a plane perpendicular to the first insulating layer 1 and perpendicular to the first direction X is a reference plane M.

An included angle a1 between each of at least one first electrode segment 211 and the reference plane M is 45±7 degrees, i.e., a value of the included angle a1 may be in a range of 38 degrees to 52 degrees, such as 38 degrees, 40 degrees, 45 degrees, 50 degrees or 52 degrees. Alternatively, an included angle a2 between each of at least one second electrode segment 311 and the reference plane M is 45±7 degrees, i.e., a value of the included angle a2 may be in a range of 38 degrees to 52 degrees, such as 38 degrees, 40 degrees, 45 degrees, 50 degrees or 52 degrees. Alternatively, the included angle a1 between each of the at least one first electrode segment 211 and the reference plane M is 45±7 degrees, and the included angle a2 between each of the at least one second electrode segment 311 and the reference plane M is 45±7 degrees, i.e., the value of the included angle a1 and the value of the included angle a2 each may be in the range of 38 degrees to 52 degrees, such as 38 degrees, 40 degrees, 45 degrees, 50 degrees or 52 degrees.

It will be noted that the pixel unit 10 may be applied to a liquid crystal display device (e.g., a vertical alignment liquid crystal display device). The liquid crystal display device includes an upper polarizer and a lower polarizer. A polarization direction of the upper polarizer is perpendicular to a polarization direction of the lower polarizer. Moreover, one of the polarization direction of the upper polarizer and the polarization direction of the to lower polarizer is parallel to the first direction X, and another one of the polarization direction of the upper polarizer and the polarization direction of the lower polarizer is perpendicular to the first direction X. Therefore, the included angle a1 between each of the at least one first electrode segment 211 and the reference plane M is set to be 45±7 degrees, or the included angle a2 between each of the at least one second electrode segment 311 and the reference plane M is set to be 45±7 degrees, or the included angle a1 between each of the at least one first electrode segment 211 and the reference plane M and the included angle a2 between each of the at least one second electrode segment 311 and the reference plane M are each set to be 45±7 degrees, so that the first electrode segment(s) 211, or the second electrode segment(s) 311, or the first electrode segment(s) 211 and the second electrode segment(s) are able to better cooperate with the upper polarizer and the lower polarizer, which is conducive to improving a light transmittance of the liquid crystal display device at this pixel unit 10, thereby being conducive to improving the display brightness.

Figure 7A:
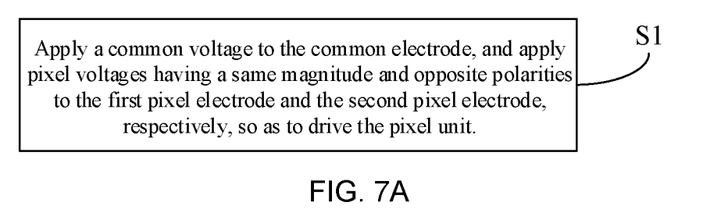
FIG. 7A is a flow diagram of a driving method of a pixel unit, in accordance with some embodiments of the present disclosure.

Some embodiments of the present disclosure provide a driving method of the pixel unit. As shown in FIG. 7A, the driving method includes S1.

In S1, a common voltage is applied to the common electrode, and pixel voltages having the same magnitude and opposite polarities are respectively applied to the first pixel electrode and the second pixel electrode, so as to drive the pixel unit.

Figure 7B:
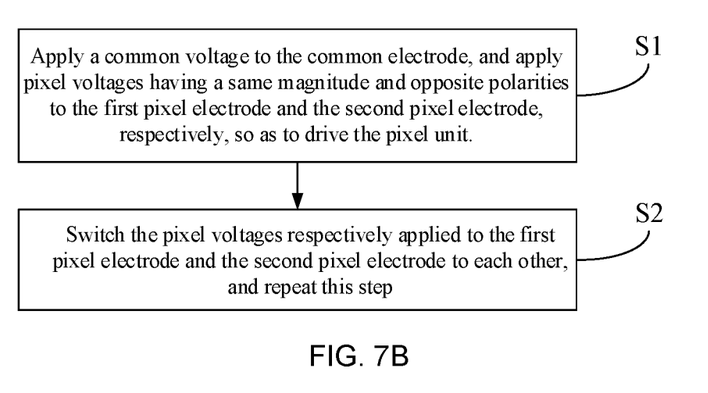
FIG. 7B is a flow diagram of another driving method of a pixel unit, in accordance with some embodiments of the present disclosure.

On this basis, for example, as shown in FIG. 7B, the driving method further includes S2.

In S2, the pixel voltages respectively applied to the first pixel electrode and the second pixel electrode are switched to each other, and this step is repeated. In this design, when different frame images are displayed, the pixel voltages respectively applied to the to first pixel electrode and the second pixel electrode may be switched to each other, which is conducive to preventing liquid crystals from being deteriorated.

The driving method of the pixel unit provided in some embodiments of the present disclosure is used for driving the pixel unit 10 in any one of the above embodiments, and is conducive to strengthening the vertical electric field and reducing the driving voltage of the liquid crystals.

Figure 8A:
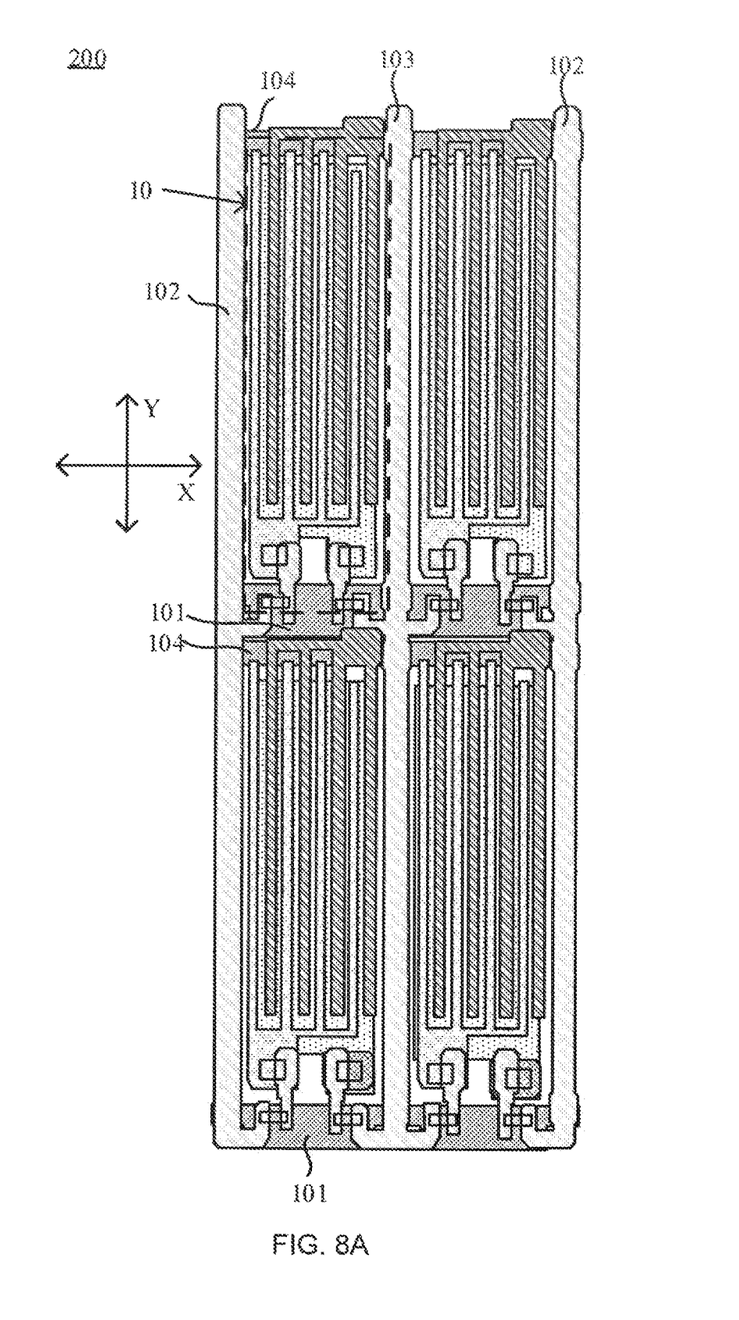
FIG. 8A is a structural diagram of an array substrate, in accordance with some embodiments of the present disclosure.
Figure 8B:
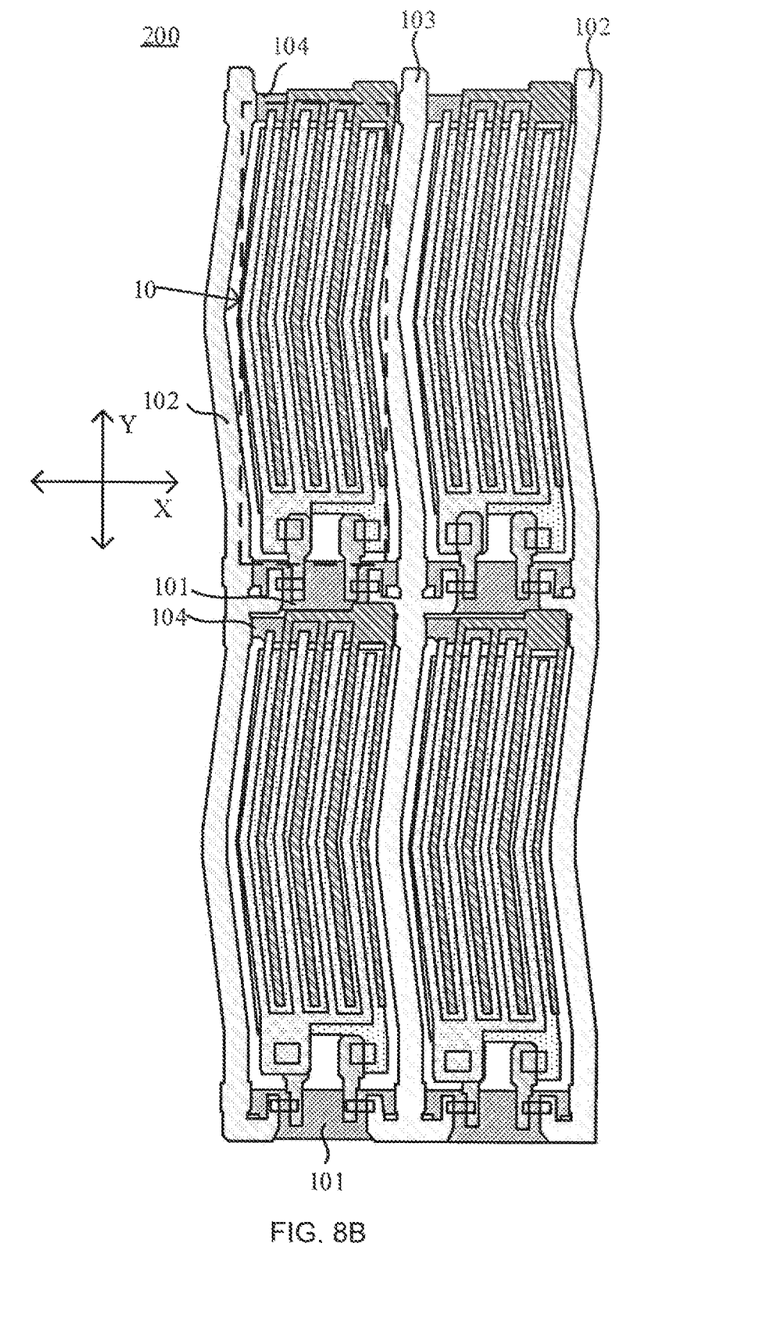
FIG. 8B is a structural diagram of another array substrate, in accordance with some embodiments of the present disclosure.

Referring to FIGS. 8A and 8B, some embodiments of the present disclosure provide an array substrate 200. The array substrate 200 includes: a plurality of scan signal lines 101 extending in the first direction X; a plurality of common voltage lines 104 extending in the first direction X; a plurality of first data voltage lines 102 extending in a second direction Y intersecting the first direction X; and a plurality of second data voltage lines 103 extending in the second direction Y. A pixel region is defined by a second data voltage line 103, a scan signal line 101, a common voltage line 104, and a first data voltage line 102. Pixel regions of the array substrate 200 are each provided with the pixel unit 10 in any one of the above embodiments.

Since the array substrate 200 includes the pixel units 10 in any one of the above embodiments, the array substrate 200 has all the beneficial effects of the pixel unit 10 as described above, which will not be repeated herein.

Figure 9:
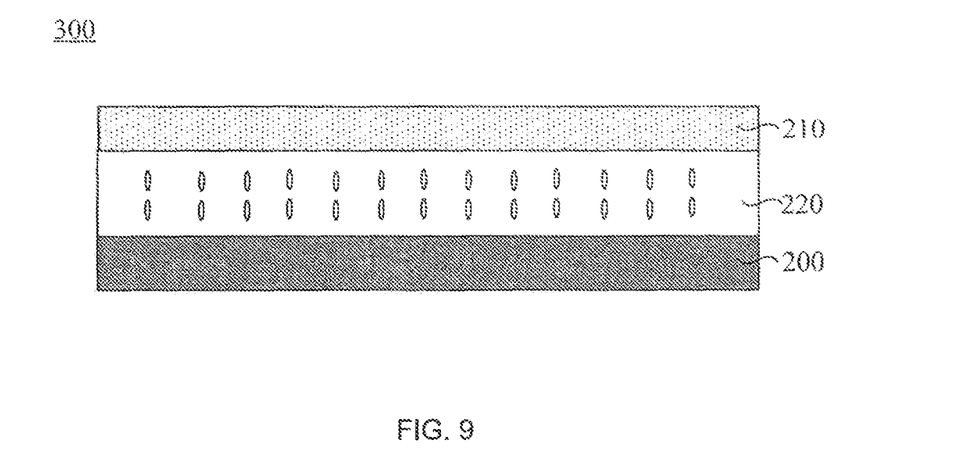
FIG. 9 is a structural diagram of a vertical alignment liquid crystal display device, in accordance with some embodiments of the present disclosure.

Referring to FIG. 9, some embodiments of the present disclosure provide a vertical alignment liquid crystal display device 300. The vertical alignment liquid crystal display device 300 includes the array substrate 200 in any one of the above embodiments, a color filter substrate 210 arranged opposite to the array substrate 200, and a liquid crystal layer 220 provided between the array substrate 200 and the color filter substrate 210. Liquid crystals in the liquid crystal layer 220 may be electronegative liquid crystals.

Figure 10:
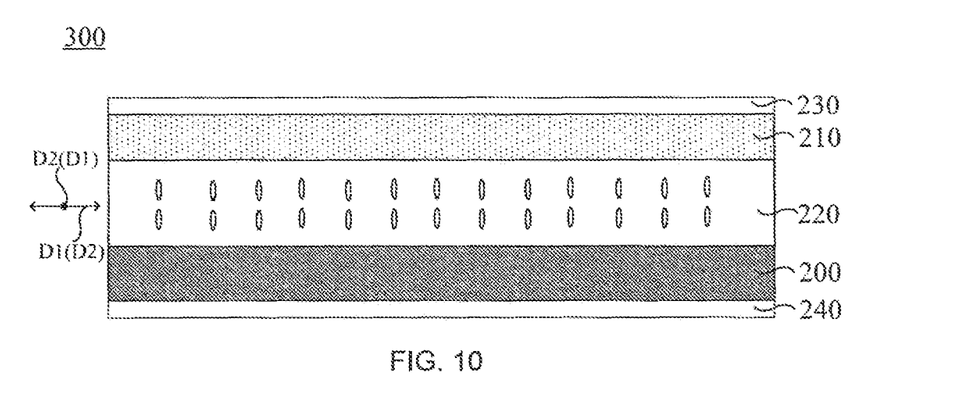
FIG. 10 is a structural diagram of another vertical alignment liquid crystal display device, in accordance with some embodiments of the present disclosure.

In some examples, referring to FIG. 10, the vertical alignment liquid crystal display device 300 further includes a first polarizer 230 (i.e., upper polarizer) located on a side of the color filter substrate 210 away from the liquid crystal layer 220, and a second polarizer 240 (i.e., lower polarizer) located on a side of the array substrate 200 away from the liquid crystal layer 220.

One of a polarization direction D1 of the first polarizer 230 and a polarization direction D2 of the second polarizer 240 is parallel to the first direction X, and another one of the polarization direction D1 of the first polarizer 230 and the polarization direction D2 of the second polarizer 240 is perpendicular to the first direction X.

It will be understood that the polarization direction D1 of the first polarizer 230 and the polarization direction D2 of the second polarizer 240 are perpendicular to each other. The first polarizer 230 may make light emitted from a backlight become linearly polarized light with the same polarization direction as the first polarizer 230. The second polarizer 240 may prevent the linearly polarized light with the same polarization direction as the first polarizer 230 from emitting, and the second polarizer 240 may make linearly polarized light with the same polarization direction as the second polarizer 240 emit. Therefore, by adjusting a state of liquid crystal molecules in the liquid crystal layer 220, a polarization angle of light passing through the liquid crystal molecules may be changed, thereby realizing the light-emitting display function.

The vertical alignment liquid crystal display device 300 may be any product or component having a display function, such as a mobile phone, a tablet computer, a television, a display, a notebook computer, a digital photo frame, or a navigator.

Since the array substrate 200 in any one of the above embodiments is used in the vertical alignment liquid crystal display device 300, the vertical alignment liquid crystal display device 300 has all the beneficial effects of the array substrate 200 as described above, which will not be repeated herein.

The foregoing descriptions are only specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A pixel unit, comprising:
a first insulating layer;
a first pixel electrode located on a first side of the first insulating layer and including a plurality of first electrode strips;
a common electrode located on the first side of the first insulating layer and including a plurality of second electrode strips; wherein the second electrode strips and the first electrode strips are sequentially and alternately arranged in a first direction; and slits each are disposed between a second electrode strip in the second electrode strips and a first electrode strip in the first electrode strips that are adjacent to each other; and
a second pixel electrode located on a second side of the first insulating layer; wherein the second side of the first insulating layer is opposite to the first side of the first insulating layer; and the second pixel electrode is overlapped with at least a region where the slits are located;
wherein each of the plurality of first electrode strips includes at least two first electrode segments connected in sequence; and two adjacent first electrode segments have a first included angle therebetween, and the first included angle is greater than 0 degree and less than 180 degrees; and each of the plurality of second electrode strips includes at least two second electrode segments connected in sequence; and two adjacent second electrode segments have a second included angle therebetween, and the second included angle is greater than 0 degree and less than 180 degrees;
wherein a plane perpendicular to the first insulating layer and perpendicular to the first direction is a reference plane; wherein an included angle between each of at least one first electrode segment and the reference plane is 45±7 degrees, and an included angle between each of at least one second electrode segment and the reference plane is 45±7 degrees;
the pixel unit further comprises:
a first thin film transistor located on the second side of the first insulating layer; wherein a control electrode of the first thin film transistor is configured to be coupled to a scan signal line, a first electrode of the first thin film transistor is configured to be coupled to a first data voltage line, and a second electrode of the first thin film transistor is coupled to the plurality of first electrode strips of the first pixel electrode; and
a second thin film transistor located on the second side of the first insulating layer; wherein a control electrode of the second thin film transistor is configured to be coupled to the scan signal line, a first electrode of the second thin film transistor is configured to be coupled to a second data voltage line, and a second electrode of the second thin film transistor is coupled to the second pixel electrode; wherein
the common electrode is configured to be coupled to a common voltage line; and
the second pixel electrode includes a planar electrode and a third conductive connection portion, and the planar electrode is located on a side of a gate insulating layer of the second thin film transistor away from the first insulating layer; the gate insulating layer includes a fourth via; and the third conductive connection portion is connected to the second electrode of the second thin film transistor, and is connected to the planar electrode through the fourth via.

2. The pixel unit according to claim 1, wherein
the first insulating layer includes a first via; and
the first pixel electrode further includes a first conductive connection portion; and the first conductive connection portion is connected to the plurality of first electrode strips, and is connected to the second electrode of the first thin film transistor through the first via.

3. The pixel unit according to claim 1, wherein
the gate insulating layer of the second thin film transistor further includes a second via; the first insulating layer includes a third via exposing the second via; and
the common electrode further includes a second conductive connection portion; and the second conductive connection portion is connected to the plurality of second electrode strips, and is connected to the common voltage line through the second via and the third via.

4. The pixel unit according to claim 1, wherein a width of a slit in the slits in the first direction is greater than or equal to 6.6 μm, and is less than or equal to 7.3 μm.

5. A driving method of the pixel unit according to claim 1, comprising:
applying a common voltage to the common electrode, and applying pixel voltages having a same magnitude and opposite polarities to the first pixel electrode and the second pixel electrode, respectively, so as to drive the pixel unit.

6. The driving method according to claim 5, further comprising:
switching the pixel voltages respectively applied to the first pixel electrode and the second pixel electrode to each other, and repeating this step.

7. An array substrate having a plurality of pixel regions, the array substrate comprising:
a plurality of pixel units according to claim 1;
a plurality of scan signal lines extending in the first direction;
a plurality of common voltage lines extending in the first direction;
a plurality of first data voltage lines extending in a second direction intersecting the first direction; and
a plurality of second data voltage lines extending in the second direction; wherein each pixel region is defined by a second data voltage line, a scan signal line, a common voltage line, and a first data voltage line; and the pixel region is provided with a pixel unit in the plurality of pixel units therein.

8. A vertical alignment liquid crystal display device, comprising:
the array substrate according to claim 7;
a color filter substrate arranged opposite to the array substrate; and
a liquid crystal layer disposed between the array substrate and the color filter substrate.

9. The vertical alignment liquid crystal display device according to claim 8, further comprising:
a first polarizer located on a side of the color filter substrate away from the liquid crystal layer; and
a second polarizer located on a side of the array substrate away from the liquid crystal layer;
wherein one of a polarization direction of the first polarizer and a polarization direction of the second polarizer is parallel to the first direction, and another one of the polarization direction of the first polarizer and the polarization direction of the second polarizer is perpendicular to the first direction.

* * * * *